UNITED STATES PATENT OFFICE.

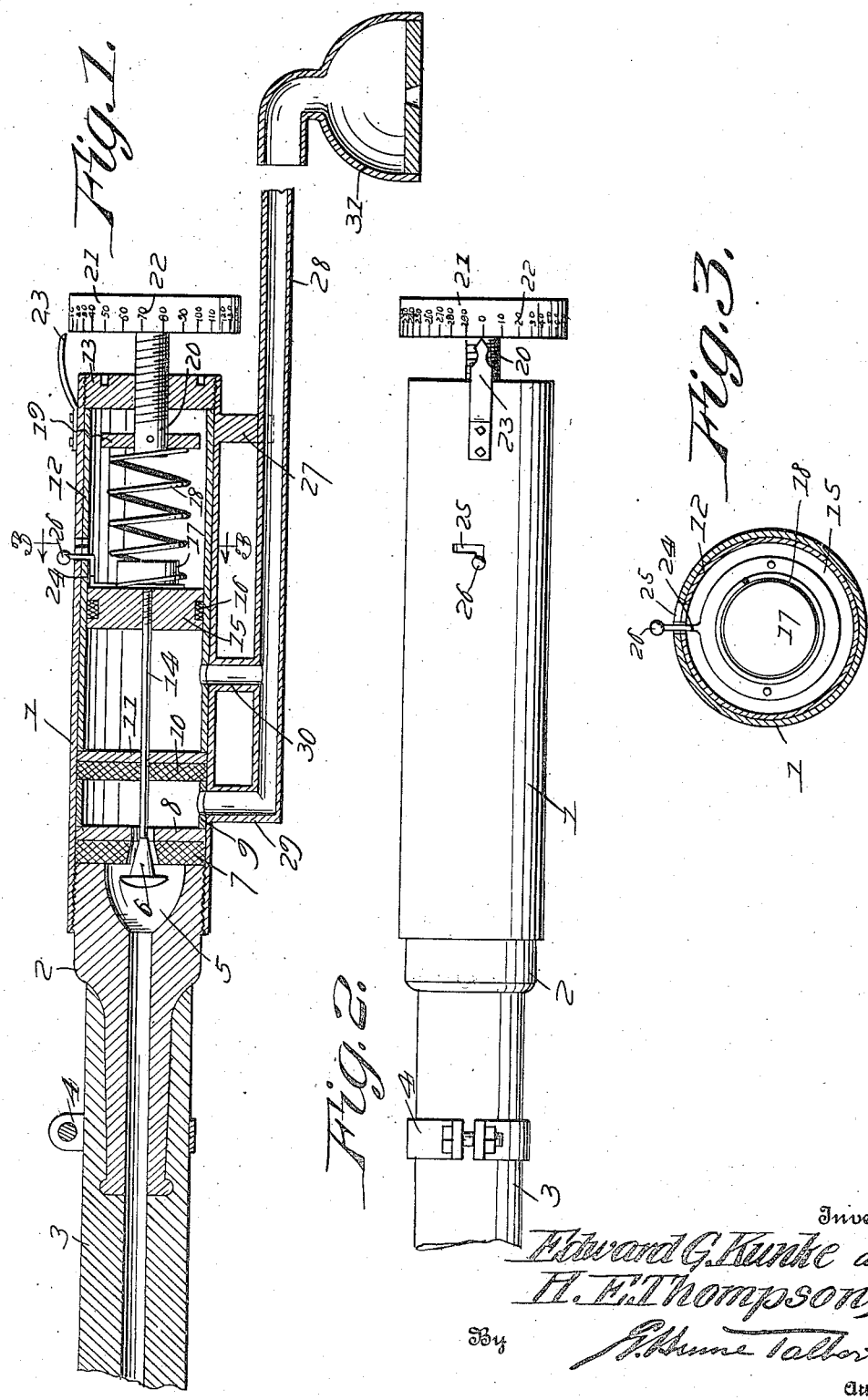
E. G. KUNKE AND H. E. THOMPSON.
PRESSURE GAGE AND CUT-OFF FOR PNEUMATIC TIRES.
APPLICATION FILED JULY 14, 1919.
1,387,991. Patented Aug. 16, 1921.
Inventors
Edward G. Kunke and
H. E. Thompson,
By
Attorney

EDWARD G. KUNKE AND HARRY E. THOMPSON, OF OKLAHOMA, OKLAHOMA.

PRESSURE GAGE AND CUT-OFF FOR PNEUMATIC TIRES.

1,387,991.  Specification of Letters Patent.  Patented Aug. 16, 1921.

Application filed July 14, 1919. Serial No. 310,852.

*To all whom it may concern:*

Be it known that we, EDWARD G. KUNKE and HARRY E. THOMPSON, citizens of the United States, residing at Oklahoma city, in the county of Oklahoma and State of Oklahoma, have invented new and useful Improvements in Pressure Gages and Cut-Offs for Pneumatic Tires, of which the following is a specification.

The object of the invention is to provide a pressure gage and cut-off to be used in conjunction with pneumatic tires in filling the same with air, the device being capable of setting to close upon the attainment of any desired air pressure within the tire. Thus the pumping up of the tires cannot be continued beyond the danger point. If the tire is designed for carrying an air pressure of 90 pounds per square inch, the device can be set so that when the tire is pumped up, a pressure rising beyond this point within the tire will be prevented. The device is designed for a wide range of setting so that it is useful in the filling of all tires irrespective of the pressure which they are designed to carry.

A further object of the invention is to provide a device of this kind which is simple in construction, durable and effective in operation, and inexpensive to manufacture.

Other and further objects appear in the following description wherein the invention is set forth in detail.

To illustrate and describe the invention a specific embodiment thereof is adhered to but to this embodiment the invention is not to be restricted. The right is reserved to make such changes or alterations as the actual reduction to practice may suggest, in so far as such changes or alterations are compatible in spirit with the annexed claims.

The same numerals of reference designate the same parts throughout the several figures of the drawing, wherein:

Figure 1 is a central longitudinal sectional view through the improved device.

Fig. 2 is a top plan view of the structure shown in Fig. 1.

Fig. 3 is a section on the line 3—3 of Fig. 1.

The preferred embodiment of the invention herein shown comprises a tubular outer casing 1 which is internally threaded at one end to receive a hose attached nipple 2 to which the air supply hose 3 is attached, that end of the hose engaging the nipple being secured thereto by an appropriate clamp 4. That end of the nipple disposed within the casing 1 is as indicated at 5 to provide a chamber in which the valve 6 is carried, this valve 6 being of the conical shape shown and having its sides designed for engagement with an appropriate valve seat formed in a mica or fiber washer 7, the latter seating against a disk 8 housed within the tubular casing. A spacing ring 9 is carried within the tubular casing 1 and has one end abutting the disk 8, the other end of this ring being in abutting relation to a leather or fiber washer 10 behind which there is carried a second disk 11. A supplemental tubular member 12 is disposed within the outer tubular casing 1 and has one end abutting the disk 11 and the other end abutting a terminal plug 13 threadingly engaged in that end of the tubular casing 1 opposite the end from which the nipple 2 engages. Obviously the engagement of the plug 13 and the nipple 2 with the outer casing shell 1 will serve to force the supplemental tubular member 12, the spacing ring 9 and the washers 7 and 10 and disks 8 and 11 into firm abutting position, so that all are held rigidly in place within the outer casing 1.

The seat for the valve 6 is formed in central openings in the washer 7 and disk 8 and the valve is provided with a stem 14 which passes slidingly through the washer 10 and disk 11 and threads into a piston 15, the latter carrying a peripheral compact ring 16 engaging the inner wall of the supplemental inner tubular member 12. On that face opposite to which the valve stem connects, the piston is formed with a circular boss 17 in surrounding relation to which there is one end of a spiral spring 18, the latter being a compression spring and having its other end connected with a disk 19 through which there is passed and to which there is secured one end of a stud 20. The stud 20 is exteriorly threaded and passed through a threaded hole formed centrally in the plug 13 the stud exterior to the plug 13 carrying a head 21, the periphery of which is supplied with indices 22 intended to indicate pounds per square inch of pressure. That end of the spring 18 which surrounds the stud 17 is loosely engaged with the boss and should the stud 20 be turned as it may be by imparting angular movement to the head 21, that end of the spring engaging the boss slides around the latter. But such movement imparted to the stud either causes it to move in the direction of the piston or in a direction away from the latter, thus increasing or diminishing the pressure of the spring and such a pressure exerted on the spring is indicated by the indices 22, the periphery of the head 21 passing beneath a pointer 23 attached to the outer casing and reading over the indices 22.

The piston 15 is designed for slight longitudinal movement in the supplemental tubular member 12 to hold the valve 6 either in open or closed position. This longitudinal movement of the piston is limited by an L-shaped latch member 24 moving within a bayonet slot 25 formed through the side walls of both the outer casing and supplemental casing 12, this L-shaped member projecting out of the casing carrying a small knob 26 to be readily engaged by the fingers. If the L-shaped member be moved back in the casing in the direction of the stud 20, it may be swung to the side to pass in the leg of the bayonet slot. The piston, upon such movement will be carried back as far as it is permitted to move in that direction and if the L-shaped member be shifted into the lateral portion of the slot, as suggested, the piston will be held in that position and the valve 6 will be held upon its seat. If the L-shaped member is not engaged in the lateral portion of the bayonet slot, the piston may be moved backwardly and forwardly the length of the portion of the slot disposed in the direction of the length of the cylinder. If the L-shaped member is in this direction of the slot the spring will force the piston forward and serve to unseat the valve 6.

Supported on the outer casing 1 by means of a web 27, there is a tubular member 28, this tubular member connecting with the interior space of the device between the disk 8 and washer 10 by means of right angularly disposed portion 29. A second connection between this tubular member and the device is by use of a right angularly disposed portion 30 which connects with the interior of the device between the disk 11 and the piston 15. At the free end, the tubular member 28 is equipped with a tire air valve engaging element 31 which will permit the device to be engaged with the air tube of a pneumatic tire.

In the operation of the device, assume that it is desired to pump up to capacity a 100 pound tire. The device is attached to the air valve of the tire by having the element 31 engage the same. Thereafter the head 21 of the stud 20 is rotated until the mark 100 on the periphery thereof stands beneath the pointer 23. This indicates that a pressure of 100 pounds per square inch upon the piston must be effected before the spring will yield, and permit the piston to move backward. The device having thus been set, air is pumped through the hose 3 and nipple 2, the valve 6 being open, the air passing through the openings in the washer 7 and disk 8. Thence through the right angular portion 29 of the tubular member, thence through the main portion of the tubular member 28 and into the tire through the air valve thereof. This continues until the pressure in the tire attains 100 pounds per square inch. When this occurs the pressure within the tubular member 28 will be this amount and the air entering the space between the disk 11 and piston will be increased to this pressure, the air reaching this space through the tubular connection 30. Thereupon the piston will yield and in so doing will draw the valve 6 down upon its seat, whereupon no more air may be forced either into the device itself or into the tire, since the only means of access from supply to the tire is through the opening closed by the valve 6.

When it is desired to close the valve 6 by hand, the piston may be moved back by means of the L-shaped member 24, when it may be turned slightly to have the leg of the L-shaped member engage the L-shaped portion of the bayonet slot. In such a position the valve is retained on its seat.

From the foregoing description and the accompanying drawings, it is believed that a clear enough understanding of the invention is to be had to render further description unnecessary.

The invention having been described, what is claimed as new and useful is:

1. The combination with a pressure regulating valve comprising a casing having means for attaching the same to an air supply hose, a piston movable in the casing, a valve carried by the piston and controlling the entrance of air into the casing, air discharge means connected with the casing, and yielding means bearing upon the piston to maintain the valve normally open until the attainment of a specified pressure within the casing which actuating the piston will close the valve, of means connected with the piston and having an exposed terminal whereby the piston may be moved manually for the closing of the valve when desired.

2. The combination with a pressure regulating valve comprising a casing having means for attaching an air supply hose to one end thereof, a piston movable in the casing, a valve carried by the piston and controlling the entrance of air from the air hose into the casing, an air discharge pipe connected with the casing, and means operatively engaged with the piston to yieldingly hold the latter into position where the valve is held in open position, of a latch member carried by the piston and playing in a bayonet slot formed in the casing, whereby the piston may be moved manually for the closing of the valve and retained in a position to keep the valve closed.

In testimony whereof they affix their signatures.

EDWARD G. KUNKE.
HARRY E. THOMPSON.